April 14, 1931. R. L. DINGLE 1,800,781
PAN LIFTER
Filed Jan. 11, 1930
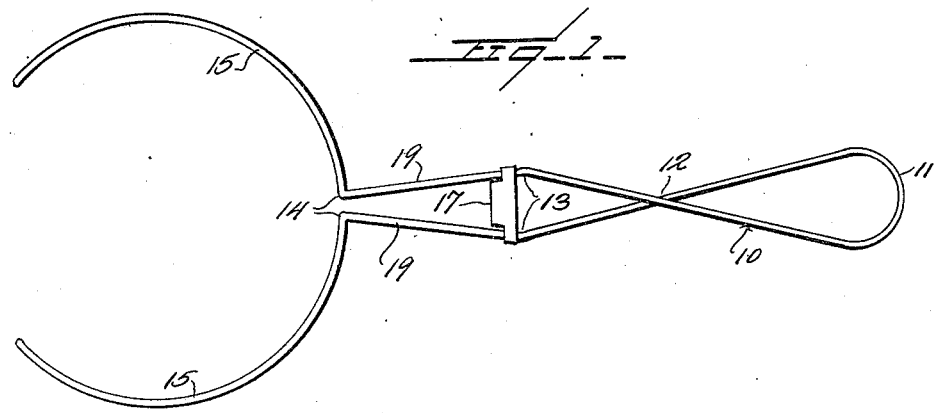
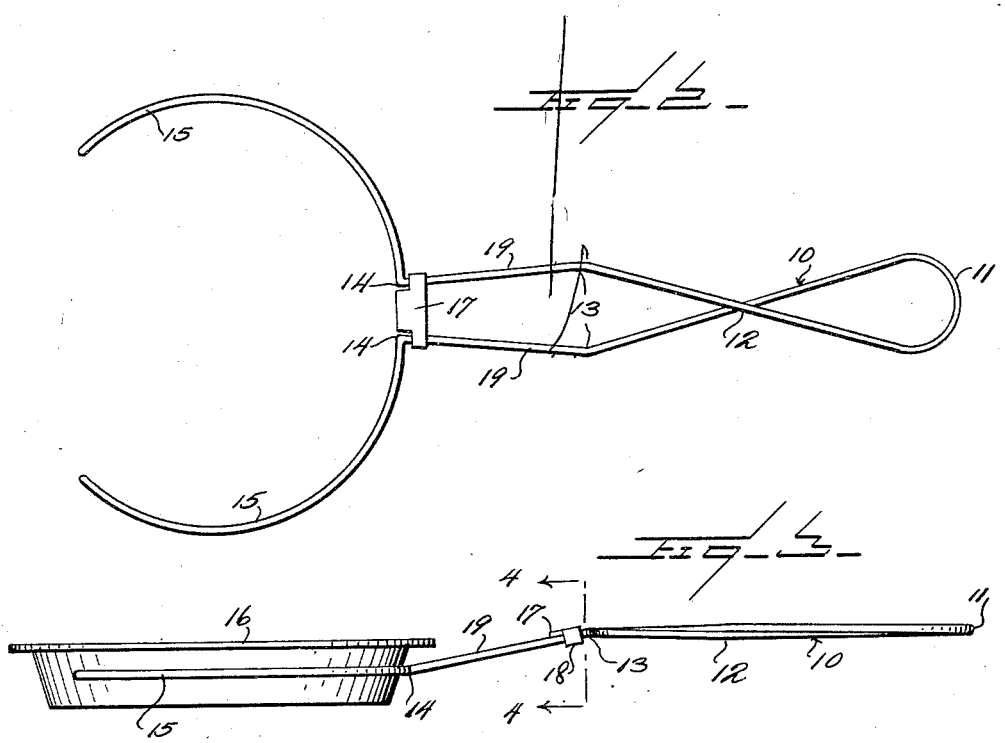
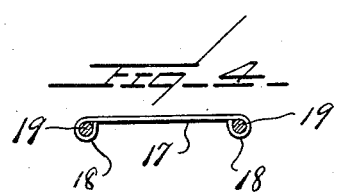
Inventor
R. L. Dingle
By Watson E. Coleman
Attorney Patented Apr. 14, 1931

1,800,781

UNITED STATES PATENT OFFICE

RICHARD L. DINGLE, OF LEHMAN, PENNSYLVANIA

PAN LIFTER

Application filed January 11, 1930. Serial No. 420,257.

The present invention relates to pan lifters and has for an important object thereof the provision of a pan lifter which may be easily and securely locked about the periphery of the pan.

Another object of this invention is to provide a resilient lifter which may be cheaply and easily manufactured.

A further object of this invention is to provide a device of this character which may be adapted for use in lifting pans of various sizes and configurations.

A still further object of this invention is to provide a lifter which is of sufficient length and strength so that a pan filled with material may be removed from the stove or the oven without the necessity of projecting the hand into the oven.

The above and various other objects and advantages of this invention will in part be described in and in part be understood from the following detailed description of the present preferred embodiment, the same being illustrated in the accompanying drawing wherein:

Figure 1 is a detail top plan view of a device constructed according to the preferred embodiment of this invention showing the device in locked or closed position;

Figure 2 is a similar view to Figure 1 showing the device in open position;

Figure 3 is a detail side elevation of the device; and

Figure 4 is a transverse section taken substantially on line 4—4 of Figure 3.

Referring to the drawing wherein like numerals of reference designate corresponding parts throughout the several views, the numeral 10 designates generally a handle structure which is constructed of resilient material, preferably substantially heavy wire. The handle 10 preferably comprises a loop structure 11, the forward ends of which are adapted to be crossed or intersected as at 12. The forwardly extending ends of the loop member 11 are preferably substantially straight and are preferably bent inwardly at 13 so as to provide an angularly inclined or inwardly tapering forward end portion. The forward ends of the handle members are preferably bent outwardly as at 14 and formed into a substantial segment or arc which is preferably substantially greater than a semi-circle. The forwardly extending arcuate arm members 15 are adapted to engage about the periphery of a pan 16 or the like.

A slidable locking member 17, which is provided with a pair of looped outer end portions 18, is adapted to be mounted about the forwardly extending arm members 19. The movement of the locking member 17 upon the tapering arm members 19 is limited by the bent portions at 13.

The loop member 11 is adapted to be normally positioned in substantially horizontal position and the forwardly extending arms 19 are preferably bent angularly from the handle members 11. The arcuate arms 15 are preferably adapted to lie in a substantially horizontal plane or in parallel relation to the handle members 11, the downwardly inclined arms 19 being bent upwardly at 14 so as to position the arcuate arms 15 in parallelism with the handle portion 11.

In the use of this device, the arcuate arms 15 are adapted to be positioned about the periphery of the utensil and when so positioned, the locking plate member 17 may be moved rearwardly so as to firmly engage the arms 15 about the periphery of the pan. When the handle portion 10 is grasped by the hand, the intersecting members 11 will be moved transversely of each other and due to the holding action of the locking member 17 the outward movement of the arms 11 will cooperatively force the arcuate arm members 15 inwardly so as to maintain a firm grip about the pan.

It will, of course, be understood that various changes and modifications may be made in the details of construction and design of the above specifically described embodiment of the invention without departing from the spirit thereof, such changes and modifications being restricted only by the scope of the following claim.

What is claimed is:—

A pan lifter of the character described comprising a resilient looped wire handle having intersecting forward end portions, a pair of converging members secured to the forward ends of the handle members, a slidable locking plate mounted on the converging members and adapted upon rearward movement thereof to draw the converging members together, stop means carried by the handle members whereby to limit the rearward movement of the plate, and a pair of curved arms secured to the forward ends of the converging members and adapted to engage about the periphery of a pan, said converging members being adapted to be moved outwardly and out of engagement with the pan upon forward movement of the locking plate.

In testimony whereof I hereunto affix my signature.

RICHARD L. DINGLE.